United States Patent
Aratani et al.

(10) Patent No.: US 7,177,264 B2
(45) Date of Patent: Feb. 13, 2007

(54) OPTICAL RECORDING MEDIUM, MANUFACTURING METHOD THEREOF, OPTICAL RECORDING METHOD, OPTICAL REPRODUCTION METHOD, OPTICAL RECORDING DEVICE, OPTICAL REPRODUCTION DEVICE AND OPTICAL RECORDING/REPRODUCTION DEVICE

(75) Inventors: Katsuhlsa Aratani, Chiba (JP); Shinji Minegishi, Shizuoka (JP); Makoto Tsukahara, Shizuoka (JP)

(73) Assignees: Sony Corporation, Tokyo (JP); Sony Disc Technology, Inc., Tokyo (JP)

( * ) Notice: Subject to any disclaimer, the term of this patent is extended or adjusted under 35 U.S.C. 154(b) by 530 days.

(21) Appl. No.: 10/481,518

(22) PCT Filed: Apr. 22, 2003

(86) PCT No.: PCT/JP03/05099

§ 371 (c)(1), (2), (4) Date: Feb. 23, 2004

(87) PCT Pub. No.: WO03/090216

PCT Pub. Date: Oct. 30, 2003

(65) Prior Publication Data
US 2004/0196779 A1 Oct. 7, 2004

(30) Foreign Application Priority Data
Apr. 22, 2002 (JP) .............................. 2002-119745

(51) Int. Cl.
 G11B 3/70 (2006.01)
 G11B 7/24 (2006.01)
 B32B 3/02 (2006.01)
(52) U.S. Cl. .................. 369/288; 369/275.4; 369/283; 428/64.4

(58) Field of Classification Search ................ 369/288, 369/283, 280, 44.13, 275.4, 275.3, 275.1, 369/13.35, 13.38, 13.39, 284, 100; 430/270.12; 428/64.4, 64.3, 64.1
See application file for complete search history.

(56) References Cited

U.S. PATENT DOCUMENTS 6,788,635 B1 * 9/2004 Aratani et al. .............. 369/100

(Continued)

FOREIGN PATENT DOCUMENTS

| EP | 1093124 A2 | 4/2001 |
|---|---|---|
| JP | 8-221801 A | 8/1996 |
| JP | 2001-184654 A | 7/2001 |

(Continued)

OTHER PUBLICATIONS

International Search Report dated Aug. 26, 2003.

*Primary Examiner*—Ali Neyzari
(74) *Attorney, Agent, or Firm*—Robert J. Depke; Rocky, Depke, Lyons & Kitzinger LLC.

(57) ABSTRACT

An optical recording medium, with a construction and a manufacturing method thereof corresponding to those of a read-only optical recording medium and which can be manufactured inexpensively, which enables additional recording of the above-described codes, marks, and other new information, which can be recorded reliably and has satisfactory characteristics, is provided. A construction is adopted in which the optical recording medium S has an information layer 2 including a portion in which information is recorded by physical shape changes in, at least, the thickness direction or the track width direction, and which comprises a reflective film 3; the reflective film is formed of Al alloy or Cu alloy with an electrical resistivity of 20 μΩ·cm or more and 90 μΩ·cm or less, and information can be additionally recorded on the reflective film 3 by thermal recording.

16 Claims, 4 Drawing Sheets

U.S. PATENT DOCUMENTS

| | | | |
|---|---|---|---|
| 6,972,076 B1 * | 12/2005 | Aratani et al. | 204/192.15 |
| 6,985,429 B2 * | 1/2006 | Aratani et al. | 369/288 |
| 2001/0046198 A1 | 11/2001 | Morioka et al. | |

FOREIGN PATENT DOCUMENTS

| | | |
|---|---|---|
| JP | 2001-357536 A | 12/2001 |

* cited by examiner

OPTICAL RECORDING MEDIUM, MANUFACTURING METHOD THEREOF, OPTICAL RECORDING METHOD, OPTICAL REPRODUCTION METHOD, OPTICAL RECORDING DEVICE, OPTICAL REPRODUCTION DEVICE AND OPTICAL RECORDING/REPRODUCTION DEVICE

TECHNICAL FIELD

This invention relates to an optical recording medium and a manufacturing method thereof, an optical recording method, an optical reproducing method, an optical recording device, an optical reproducing device, and an optical recording and reproducing device.

BACKGROUND ART

As a conventional optical recording medium there are optical discs, that is, so-called ROM (Read-Only Memory) type discs used only for reproduction such as CDs (Compact Discs) and DVDs (Digital Versatile Discs), for audio, game program and other uses.

Information recording on such optical recording medium is performed by forming a recording portion recorded as changes in physical shape in the thickness direction or in the track width direction, for example, pits and lands or meandering guide grooves or similar, and also a reflective film of an Al film or similar is deposited such that the information in these recording portions can be read optically with a high SNR (signal-to-noise ratio).

An optical recording medium having a recording portion with such changes in physical shape affords the advantage that manufacturing can be performed inexpensively in large volumes, since for example injection molding is used to form the plastic substrate and at the same time forms the recording portion, or that the recording portion is formed by the 2P method (photopolymerization method) on for example plastic substrate.

Hence in this type of an optical recording medium, there is the problem of replication by routes other than the formal one, for example, replication without obtaining the consent of copyright holders.

Because this optical recording medium is read in a non-contact manner, and there is almost no degradation of characteristics due to repeated use, sales may take place through non-normal routes such that used articles are sold as new articles and similar cases, so that in a similar manner the problem of sales without the consent of the copyright holders may occur.

Hence there is a desire to be able to record, in such types of an optical recording medium, a code, mark or similar as means for discriminating by the manufacturer whether, for example, the article has passed through normal routes.

Further, it is desired that, for example in game applications, it be possible to perform recording sufficient to judge the ending point where a user interrupts and ends a game, and that it be possible to easily record personal information for the user and similar on the user side.

Also, manufacturers and users desire a function enabling correction of a portion of the data accumulated on a disc, or enabling partially adding of new data, after the disc is manufactured. Taking car navigation applications as an example, through addition of the above-described function, simply map modifications and added information could be transmitted from the manufacturer, or data could be obtained by the user himself, and recorded on the disc on the user side.

An optical recording medium enabling conventional optical recording, that is, a write-once optical recording medium and a rewritable optical recording medium, conventionally are constructed from a recording film, comprising recording material the optical characteristics of which change upon irradiation by a recording laser, and a reflective film comprising material with high reflectivity.

A write-once optical recording medium, such as for example a CD-R medium to which writing is possible only once, is fabricated by coating a plastic substrate having guide grooves with a dye material using a spin-coating method, after which a metal thin film of Au or another material with high reflectivity is formed by sputtering.

A rewritable magneto-optical recording medium is fabricated by sequentially sputtering, on a plastic substrate in which are formed guide grooves, a transparent dielectric film, a perpendicular magnetization film of TbFeCo or other recording material, a transparent dielectric film, and an Al reflective film.

Further, a rewritable phase-change recording medium is constructed using GeSbTe or another phase-change material as the recording material in the above-described rewritable optical recording medium.

However, all of these recording materials are expensive, and because of the need to form numerous films in a rewritable optical recording medium as described above, there are a large number of manufacturing processes; when these recording materials are used to form a additional recording layer, costs are much higher than for the above-described CDs or other ROM-type optical recording media.

In addition, by using a write-once optical recording medium constructed with a single layer of AuSn or AuSnTi thin film or TeO thin film as the recording film, or a single-layer film of GeSbTe or similar used in phase-change recording, it is possible to construct an optical recording medium which, even employing only a single layer, enables additional recording; however these materials also are expensive to pose a problem.

Hence inventors of the present invention and others have proposed an optical recording medium constructed to enable additional data recording, using a semiconductor laser having ordinary output, in film in which Ge, Ti, Ni, Si, Tb, Fe, Ag or similar is added in a specific amount to Al.

However, when additionally recording data to such film, due to fluctuations in the sputtering deposition conditions and in the composition of the target used in sputtering, or to fluctuations in the thickness of the film formed, the laser power necessary for optical writing to the film may fluctuate, and as a result there is the problem that stable recording cannot be performed.

In order to resolve the above-described problems, in this invention an optical recording medium which can be manufactured inexpensively due to a construction and manufacturing method corresponding to the construction of a read-only optical recording medium, which enables the additional recording of the above-described codes, marks, and other new information, and which has satisfactory characteristics enabling stable recording, as well as a manufacturing method thereof, an optical recording method, an optical reproducing method, an optical recording device, an optical reproducing device, and an optical recording and reproducing device are provided.

DISCLOSURE OF THE INVENTION

An optical recording medium of this invention has an information layer comprising a reflective film, and in which is formed a portion for information recording through physical shape changes in, at least, either the thickness direction or the track width direction; the reflective film is constructed to enable additional recording by means of thermal recording, and comprises an Al alloy or Cu alloy having an electrical resistivity of 20 $\mu\Omega\cdot$cm or more and 90 $\mu\Omega\cdot$cm or less.

One method of manufacturing an optical recording medium of this invention has a process in which a reflective film, comprising Al alloy or Cu alloy with an electrical resistivity of 20 $\mu\Omega\cdot$cm or more and 90 $\mu\Omega\cdot$cm or less, is formed on a substrate, on which is formed a portion for information recording by physical shape changes in, at least, the thickness direction or the track width direction, and a process in which additional recording of information is performed by thermal recording in the reflective film.

Another method of manufacturing an optical recording medium of this invention has a process in which a reflective film, comprising Al alloy or Cu alloy with an electrical resistivity of 30 $\mu\Omega\cdot$cm or more and 90 $\mu\Omega\cdot$cm or less, is formed on a substrate, on which is formed a portion for information recording by physical shape changes in, at least, the thickness direction or the track width direction; a process in which a protective film is formed on this reflective film; and a processing in which thereafter, additional recording of information is performed by thermal recording in the reflective film.

An optical recording method of this invention is a method performed on optical recording medium having an information layer in which is formed a portion for information recording by physical shape changes in, at least, the thickness direction or the track width direction, and comprising a reflective film of an Al alloy or Cu alloy with electrical resistivity of 20 $\mu\Omega\cdot$cm or more and 90 $\mu\Omega\cdot$cm or less, wherein additional recording of information is performed by thermal recording to alter the reflective film properties and change the reflectivity thereof.

An optical reproducing method of this invention is a method performed on an optical recording medium having an information layer in which is formed a portion for information recording by physical shape changes in, at least, the thickness direction or the track width direction, and comprising a reflective film of an Al alloy or Cu alloy with electrical resistivity of 20 $\mu\Omega\cdot$cm or more and 90 $\mu\Omega\cdot$cm or less and in which additional recording of information is performed on the reflective film by thermal recording to alter the reflectivity thereof, wherein additionally recorded information is reproduced by irradiating laser light to obtain minute changes in returning light caused by reflectivity changes.

An optical recording device of this invention comprises means for optical recording on an optical recording medium having an information layer in which is formed a portion for information recording by physical shape changes in, at least, the thickness direction or the track width direction, and comprising a reflective film of an Al alloy or Cu alloy with electrical resistivity of 20 $\mu\Omega\cdot$cm or more and 90 $\mu\Omega\cdot$cm or less; this optical recording means has means for irradiating the optical recording medium with laser light which is modulated according to the additionally recorded information, and additional recording is performed by irradiating this laser light to perform thermal recording which alters the properties of the reflective film and changes the reflectivity.

An optical reproducing device of this invention comprises means for optical reproduction from an optical recording medium having an information layer in which is formed a portion for information recording by physical shape changes in, at least, the thickness direction or the track width direction, and comprising a reflective film of an Al alloy or Cu alloy with electrical resistivity of 20 $\mu\Omega\cdot$cm or more and 90 $\mu\Omega\cdot$cm or less; this optical reproducing means has reproduction light irradiation means for irradiating the optical recording medium with reproduction light, and detection means which detects the light returning from the reflective film, and minute changes in the detected output from the detection means are obtained as reproduction signals for the additionally recorded information.

An optical recording and reproducing device of this invention comprises means for optical recording and reproduction of an optical recording medium having an information layer in which is formed a portion for information recording by physical shape changes in, at least, the thickness direction or the track width direction, and comprising a reflective film of an Al alloy or Cu alloy with electrical resistivity of 20 $\mu\Omega\cdot$cm or more and 90 $\mu\Omega\cdot$cm or less; this optical recording and reproducing means has means for irradiating the optical recording medium with laser light which is modulated according to the additionally recorded information, and additional recording is performed by irradiating this laser light to perform thermal recording which alters the properties of the reflective film and changes the reflectivity; the optical recording and reproducing means also has reproduction light irradiation means for irradiating the optical recording medium with reproduction light and detection means which detects the light returning from the reflective film, and minute changes in the detected output from the detection means are obtained as reproduction signals for the additionally recorded information.

According to the above-described construction of an optical recording medium of this invention, in an optical recording medium which has for example an information recording portion in which are formed physical shape changes carrying information such as pits and lands or meandering guide grooves, and moreover on which is formed a reflective film, an additional recording region can be formed without resulting in any increase in the number of films, solely by selecting the material of the reflective film (an Al alloy or Cu alloy) and the electrical resistivity thereof. Consequently, inexpensive volume production is possible similarly to a conventional read-only optical recording medium, without resulting in an increase in the number of manufacturing processes.

According to one of the above-described methods of manufacturing optical recording medium of this invention, by selecting a material and electrical resistivity for a reflective film and forming the reflective film on substrate, and then performing additional recording to this reflective film, inexpensive volume production can be performed similarly to a conventional read-only optical recording medium without resulting in an increase in the number of films or an increase in the number of manufacturing processes; and by selecting the electrical resistivity of the reflective film in the range of 20 $\mu\Omega\cdot$cm or more and 90 $\mu\Omega\cdot$cm or less, recording can be performed at comparatively low recording power, fluctuations in recording power can be suppressed, and stable recording onto the reflective film can be performed.

According to the other of the above-described methods of manufacturing an optical recording medium of this invention, by selecting a material and electrical resistivity for a reflective film and forming the reflective film on substrate, forming a protective film on the reflective film, and then performing additional recording to this reflective film, inexpensive volume production can be performed similarly to a conventional read-only optical recording medium without resulting in an increase in the number of films or an increase in the number of manufacturing processes; and by selecting the electrical resistivity of the reflective film in the range of 30 μΩ·cm or more and 90 μΩ·cm or less, recording can be performed at comparatively low recording power, fluctuations in recording power can be suppressed, and stable recording onto the reflective film can be performed.

According to the above-described optical recording method of this invention, by using thermal recording in which the properties of the reflective film are altered and the reflectivity is changed to additionally record information to the above-described optical recording medium of this invention, recording can be performed at comparatively low recording power, and by controlling the thickness of the reflective film during film deposition, fluctuations in the recording power can be suppressed. As a result, additional recording to the reflective film can be performed reliably. Also, information can be additionally recorded on the reflective film without a complicated process.

According to the above-described optical reproducing method of this invention, an optical recording medium having the construction of the above-described optical recording medium of this invention, to which information has been additionally recorded by thermal recording in which the reflectivity of the reflective film has been changed, is irradiated with laser light, and the additionally recorded information is reproduced through minute changes in the returning light due to the reflectivity changes; because additional recording to the reflective film of the optical recording medium of this invention is performed reliably, reproduction signals with an adequate CNR (carrier-to-noise ratio) can be obtained. Further, reproduction of additionally recorded information can be performed without a complicated process.

The above-described optical recording device, optical reproducing device, and optical recording and reproducing device of this invention, by comprising optical recording means, optical reproducing means, and optical recording and reproducing means for the above-described optical recording medium of this invention, can adopt a simple construction similar to that of conventional devices.

BEST MODE FOR CARRYING OUT THE INVENTION

Figure 1:
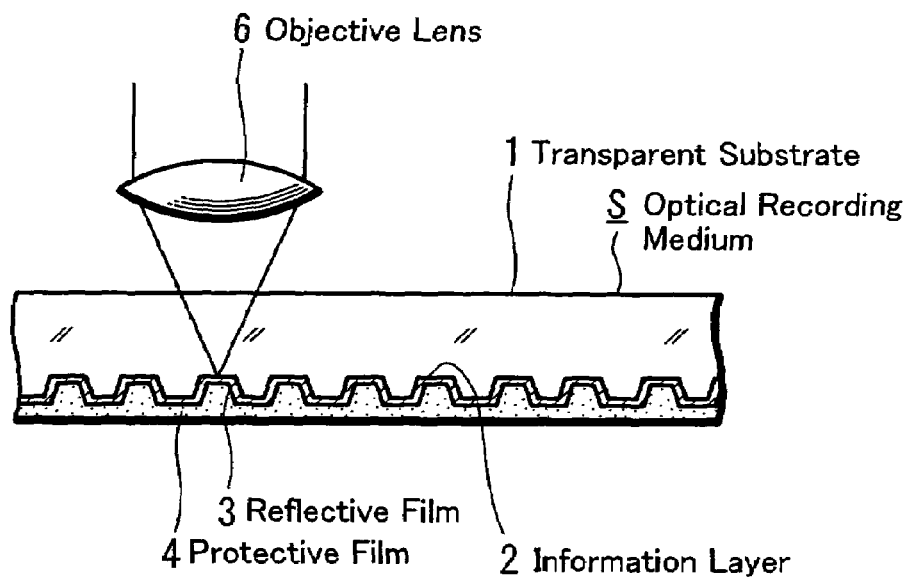
FIG. 1 is a schematic constitutional view (cross-sectional view) of an optical recording medium according to an embodiment of the present invention.

The present invention is an optical recording medium, having an information layer in which is formed a portion for information recording through physical shape changes in at least either the thickness direction or the track width direction, and comprising reflective film; the reflective film is constructed to enable additional recording by thermal recording, and comprises Al alloy or Cu alloy the electrical resistivity of which is 20 μΩ·cm or more, and 90 μΩ·cm or less.

The above optical recording medium of this invention is constructed with one or more elements selected from among, at least, Ti, Si, Cu, Al, Fe, W, Cr, O, Ar, Mg, and Tb added to an Al alloy or a Cu alloy.

The above optical recording medium of this invention is constructed with the recording region for additionally recorded information provided either within or outside of the recording region having a portion for information recording in which physical shape changes are effected.

The above optical recording medium of this invention is constructed with a protective film formed on top of the reflective film.

The above optical recording medium of this invention is constructed with the electrical resistivity of the reflective film of 30 μΩ·cm or more, and 90 μΩ·cm or less.

The present invention is a method of manufacturing an optical recording medium, comprising a process of forming, on a substrate on which is formed a portion for information recording by physical shape changes in at least the thickness direction or the track width direction, a reflective film of Al alloy or Cu alloy the electrical resistivity of which is 20 μΩ·cm or more and 90 μΩ·cm or less, and a process of additionally recording information in the reflective film by thermal recording.

In the above-described method of manufacturing the optical recording medium of this invention, after the process to additionally record information, a protective film is formed on top of the above reflective film.

The present invention is a method of manufacturing an optical recording medium, comprising a process of forming, on substrate on which is formed a portion for information recording by physical shape changes in at least the thickness direction or the track width direction, a reflective film of Al alloy or Cu alloy the electrical resistivity of which is 30 μΩ·cm or more and 90 μΩ·cm or less, a process of forming a protective film on the reflective film, and a subsequent process of additionally recording information in the reflective film by thermal recording.

The present invention is an optical recording method performed on an optical recording medium, having an information layer in which is formed a portion for information recording through physical shape changes in at least either the thickness direction or the track width direction, and comprising reflective film of Al alloy or Cu alloy the electrical resistivity of which is 20 μΩ·cm or more and 90 μΩ·cm or less, wherein additional recording of information is performed by thermal recording in which the properties of the reflective film are altered and the reflectivity thereof is changed.

In the above optical recording method of this invention, the optical recording medium has a construction in which a protective film is formed on the reflective film, and the electrical resistivity of the reflective film is 30 μΩ·cm or more, and 90 μΩ·cm or less.

The present invention is an optical reproducing method to reproduce information additionally recorded to optical recording medium, having an information layer in which is formed a portion for information recording through physical shape changes in at least either the thickness direction or the track width direction, and comprising reflective film of Al alloy or Cu alloy the electrical resistivity of which is 20 μΩ·cm or more and 90 μΩ·cm or less, and in which additional recording of information is performed on the reflective film by thermal recording to alter the reflectivity thereof, wherein additionally recorded information is reproduced by irradiating laser light to obtain minute changes in returning light caused by reflectivity changes.

In the above optical reproducing method of this invention, the optical recording medium is constructed with a protective film formed on the reflective film.

In the above optical reproducing method of this invention, the optical recording medium is constructed with the electrical resistivity of the reflective film which is 30 μΩ·cm or more, and 90 μΩ·cm or less.

The recording medium of this invention can be applied to CDs, DVDs, and other optical recording media.

That is, this invention is an optical recording medium having, on a disc-shape or card-shape substrate, or on a sheet substrate or similar, an information recording portion on which is recorded the bulk of the data, recorded as physical shape changes in at least the thickness direction or the track width direction, that is, having a ROM portion, and having an information layer formed by deposition of a reflective film; in particular, the reflective film has a construction enabling additional recording by thermal recording, and comprises an Al alloy or Cu alloy with an electrical resistivity of 20 μΩ·cm or more and 90 μΩ·cm or less.

This reflective film can have a single-layer structure comprising an Al alloy or Cu alloy.

FIG. 1 shows a schematic constitutional view (side view) of an optical recording medium, as an embodiment of this invention. This optical recording medium S is a read-only optical disc so-called CD to which this invention is applied.

In this optical recording medium S, information is stored in advance by pits and lands or meandering guide grooves on one main surface of a transparent substrate 1 composed of, for example, polycarbonate (PC) resin, and on top of this (in FIG. 1, on the bottom side) is formed a reflective film 3. A protective film 4 is formed on the side of the reflective film 3 opposite the transparent substrate 1.

That is, by means of pits and lands or meandering guide grooves at the interface between the transparent substrate 1 and the reflective film 3, an information layer (information recording portion) 2 based on concavity and convexity is formed.

The transparent substrate 1 is formed by, for example, injection molding or another plastic molding method, or by the 2P method or similar.

The reflective film 3 is deposited by a sputtering method, and in general using magnetron sputtering, due to the ease of deposition.

As the protective film 4, for example, an ultraviolet-curing resin is used. After applying the ultraviolet-curing resin to the surface of the reflective film 3 by spin-coating or another method, irradiation with ultraviolet rays is used to cure the resin and form the protective film 4.

Figure 2:
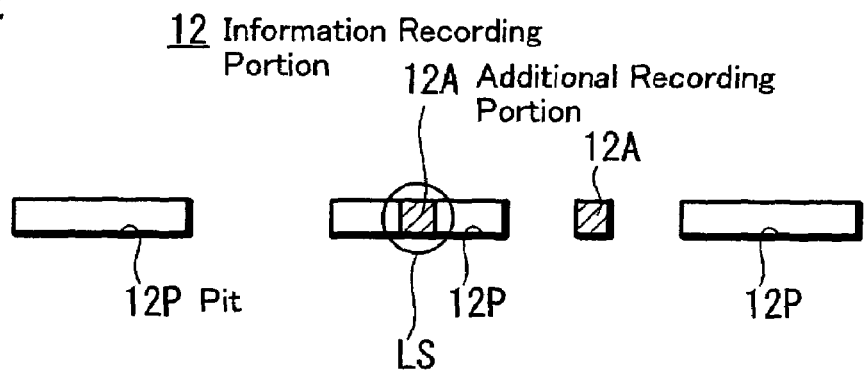
FIG. 2 is a schematic plan view of the relevant portions in the optical recording medium of FIG. 1, showing the relations between the recording portion and additional recording portion in one embodiment of the reflective film.
Figure 3:
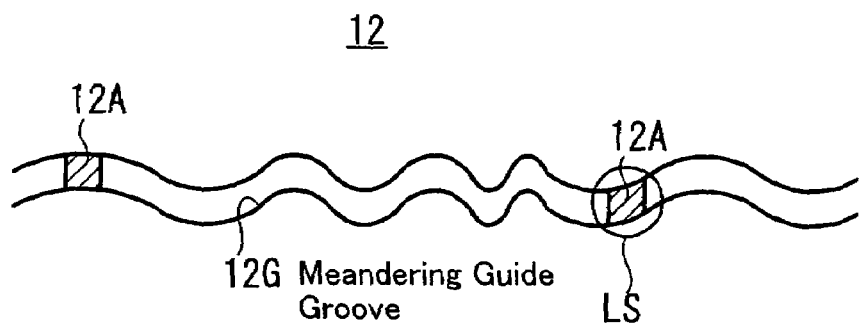
FIG. 3 is a schematic plan view of the relevant portions in the optical recording medium of FIG. 1, showing the relations between the recording portion and the additional recording portion in another embodiment of the reflective film.

As is shown in portions of the schematic plan views in for example FIG. 2 or FIG. 3, in the information layer 2 is formed the original recording portion with information formed as pits and lands 12P deformed in the thickness direction as shown in FIG. 2, or the original information recording portion 12 with information formed as meandering guide grooves 12G deformed in the track width direction as shown in FIG. 3.

The information recording portion 12, that is, the lands and pits 12P or meandering guide grooves 12G can be formed by a method for forming the main surface simultaneously with molding of the substrate 1 by injection molding using a stamper having corresponding pits or grooves, or can be formed by a method (the so-called 2P method) in which for example an ultraviolet-curing resin is applied to a transparent substrate 1 and a stamper having predetermined pits or grooves is then pressed, and the resin is hardened; or another conventional method can be used.

Further, not only does the optical recording medium S of this embodiment have the function of reflecting readout light when originally recorded information or the like is readout from the recording portion 12, but the reflective film 3 can also be used as a recording layer for additionally recording information. That is, by means of this reflective film 3, an additional recording region is formed.

This additional recording region can be formed, depending upon the purpose of additional recording, either within the above-described pits and lands 12P or meandering guide grooves 12G, or outside the region of formation of the original information recording portion 12.

When the additional recording region is formed within the recording region of the information recording portion 12, it is desirable that the additional recording region be provided outside the shortest period of physical shape changes.

That is, as shown in FIG. 2, when the information recording portion 12 adopts a recording mode using the shapes of lands and pits 12P, outside the shortest land-pit pitch of the lands and pits 12P, additional recording portions 12A are formed in the pit portions due to pits or lands, or between the pits or the like.

Also, as shown in FIG. 3, when the information recording portion 12 is constructed using meandering guide grooves 12G, additional recording portions 12A can be formed within the meandering guide grooves 12G, for example, outside the shortest period portion of the oscillating change in the track width direction thereof.

In FIG. 2 and FIG. 3, LS denotes a spot of laser light to form the additional recording portion 12A.

As the laser light used for additional recording, focused laser light of intensity greater than laser light for reproduction is employed.

When the additional recording region is provided outside the recording region of the information recording portion 12, lands and pits or meandering guide grooves can be provided outside the recording region of the original information recording portion 12, and an additional recording region can be formed therein.

Figure 4:
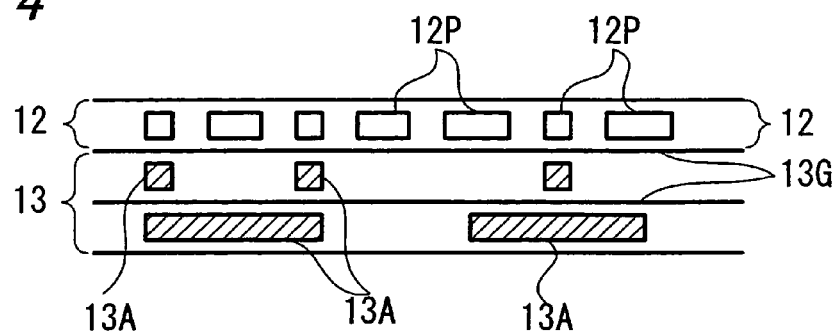
FIG. 4 is a schematic plan view of the relevant portions in the optical recording medium of FIG. 1, showing the relations between the recording portion and the additional recording portion in still another embodiment of the reflective film.

For example, as shown in FIG. 4, separately from the lands and pits 12P formed in advance as the original information recording portion 12, a region in which a guide groove 13G for additional recording is formed can be used as the additional recording region 13, and recording by laser irradiation in this additional recording region 13 can be performed to form an additional recording portion 13A.

Figure 5:
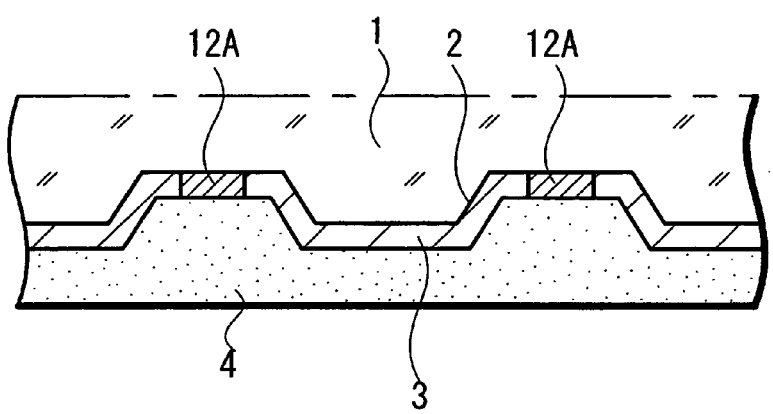
FIG. 5 is a schematic plan view showing a state in which additional recording has been performed in the reflective film, in the optical recording medium of FIG. 1.

In any of the cases shown in FIG. 2 through FIG. 4, when showing by cross-sectional views, recording is performed by irradiating a portion of the reflective film 3 with laser light as shown, for example, in FIG. 5, and an additional recording portion 12A is formed.

In FIG. 5, additional recording regions 12A are formed only in the land portions of the recording layer 2 as seen from the laser light entering side; but additional recording regions 12A can be formed only in pit portions of the recording layer 2, or can be formed in both the land portions and the pit portions of the recording layer 2.

In order to form additional recording regions 12A using the reflective film 3, a material is used in the reflective film 3, the reflectivity to readout light of which changes upon thermal recording by irradiating, for example, laser light.

Al alloys and Cu alloys are examples of materials of such a reflective film 3.

Further, in particular, by employing a composition for the reflective film 3 in which an Al alloy or Cu alloy contains one or more elements selected from among, at least, Ti, Si, Cu, Al, Fe, W, Cr, O, Ar, Mg and Tb (with the selected element or elements added), the reflective film 3 has electrical resistivity suitable for additional recording.

Here, with respect to metals, the following Wiedemann-Franz relation exists between the electrical resistivity $\rho$, which is the reciprocal of the electrical conductivity, and the thermal conductivity k; hence it is known that the electrical resistivity and the thermal conductivity are inversely proportional.

$$k = LT/\rho \quad (1)$$

Here $L=2.5 \times 10^{-8}$ W$\Omega$/K$^2$ is a constant called the Lorentz number, and T(K) is the absolute temperature.

The increase in temperature of a reflective film of Al, Ag, Au, Cu with high thermal conductivity upon being irradiated with focused light is approximately inversely proportional to the thermal conductivity.

Hence the rise in temperature is proportional to the electrical conductivity, and the higher the electrical resistivity of a material, the lower the power at which recording is possible.

Because the electrical resistivity of simple Al and simple Cu is low, from the above equation (1) the thermal conductivity is large, and heat dissipation occurs readily, so recording is difficult unless the recording power is made large.

On the other hand, if one or more elements are selected from among, at least, Ti, Si, Cu, Al, Fe, W, Cr, 0, Ar, Mg and Tb and included in an Al alloy or Cu alloy as described above, then the included element or elements can raise the electrical resistivity above that of simple Al or simple Cu, and recording can be performed at lower recording power levels.

Further, it is preferable that the electrical resistivity of the reflective film 3 the material of which is such an Al alloy or Cu alloy containing one or more elements selected from among, at least, Ti, Si, Cu, Al, Fe, W, Cr, O, Ar, Mg and Tb is 20 $\mu\Omega$·cm or more, and more preferably 30 $\mu\Omega$·cm or more, and is 90 $\mu\Omega$·cm or less.

The electrical resistivity of the reflective film 3 changes depending on the film thickness d of the reflective film 3, and the alloy composition, particularly the type and ratio of content of the elements included in the alloy.

In the process of forming the reflective film 3, a sputtering target formed from an Al or AlSi alloy or from material with the desired composition, or a plurality of targets comprising the simple materials and alloys of each of the constituent elements, are used to perform sputtering after evacuating the interior of the sputtering chamber to at least a predetermined state of vacuum.

When depositing this reflective film 3 by a sputtering method, the types and contents of the metal elements contained in the Al alloy or Cu alloy change according to the types of sputtering targets.

Also, the contents of oxygen (O) and argon (Ar) contained in the deposited reflective film change depending on the ultimate vacuum and the sputtering gas pressure during sputtering to deposit the reflective film 3.

Hence the electrical resistivity of the reflective film 3 thus deposited also changes with the types of sputtering target, the background vacuum pressure, the type of sputtering gas and the like.

Further, during the process to deposit the reflective film 3, by controlling the sputtering power and time, the film thickness of the reflective film 3 can be controlled.

Accordingly, the film thickness of the reflective film 3 can be controlled, and so the reflective film 3 with the desired electrical resistivity can be obtained.

If, as described above, a reflective film 3 is deposited and optical recording medium S is fabricated, then by using comparatively inexpensive Al alloy as the material of the reflective film 3, it is possible to provide optical recording medium enabling additional recording, at a low cost comparable to that of conventional read-only optical recording medium (ROM discs and similar).

Figure 6:
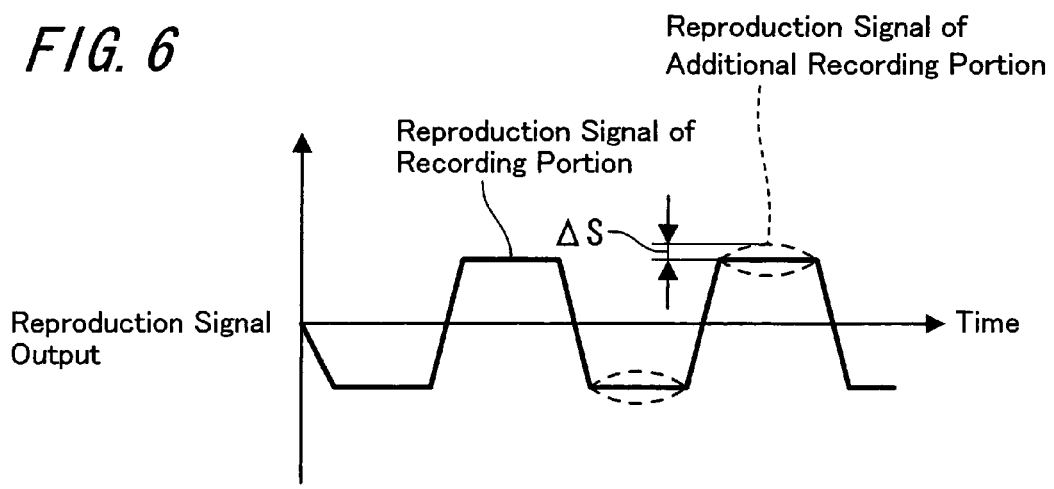
FIG. 6 is a drawing showing a reproduction signal output waveform for the optical recording medium of FIG. 1.

FIG. 6 shows a reproduction signal output waveform for the recording portion 12 and additional recording portion 12A of the optical recording medium of this embodiment. As shown in FIG. 6, the output of the reproduction signal of the additional recording portions 12A, shown by the dashed lines in the drawing and based on changes in the reflectivity of the additional recording portions 12A, that is, based on increases or reductions in the reflectivity, changes minutely ($\Delta$S) with respect to the reproduction signal output of the recording portions 12 due for example to pits and lands shown by the solid line in the drawing. Hence by detecting these minute changes $\Delta$S, the detected minute output can be obtained as a reproduction signal of the additional recording.

The signal of additional recording is in actuality of low density, with narrow bandwidth.

Further, on additional recording, the same signal can be recorded in a plurality of locations in the additional recording regions, and when reproducing the signal at these plurality of locations, a reproducing method different from the normal reproducing method of the recording portions 12 can be employed to perform reliable reproduction of additionally recorded information.

As reflective films 3, Al alloys with various impurities added were deposited to fabricate an optical recording medium S, the characteristics of which were studied.

First, as the transparent substrate 1 there were prepared substrates using injection-molded polycarbonate resin with a continuous guide groove formed, with track pitch 1.6 $\mu$m and of depth 65 nm.

Next, as the reflective film 3, Al alloys with various impurities added to Al were deposited by magnetron sputtering onto these transparent substrates 1.

Next, the Al alloy films were irradiated with laser light to perform recording equivalent to the above-described additional recording.

Then, the recorded regions of the reflective films 3 were irradiated with laser light to perform reproduction.

At this time, the optical system used in recording and reproduction emitted light with a wavelength of 785 nm, and had an objective lens numerical aperture NA of 0.50 and a linear velocity of 4.8 m/s. In recording, the frequency was 2 MHz and the recording pulse duty was 40%.

The characteristics of the reflective films 3 were measured as follows.

First, a spectrum analyzer was used to measure the CNR of signals recorded on the reflective film 3 with a resolution bandwidth of 30 kHz.

The electrical resistivity of reflective films 3 was measured using the four-terminal method.

The recording power was varied as appropriate in a range up to 35 mW, according to the alloy composition of the reflective film 3.

Table 1 shows measured values for recording power, CNR, the electrical resistivity of reflective films, when the film thickness of the reflective film 3, the ultimate vacuum, and the argon gas (Ar) pressure during sputtering were respectively varied for reflective films 3 of an Al alloy with composition $Al_{92.5}Ti_{7.5}$ (atomic percent).

The recording power in Table 1 was the power at which, upon increasing the recording power, the CNR reached 30 dB. Values in the recording power column are the recording powers when, upon varying the recording power in the range stated above, a CNR of 30 dB was not obtained. The electrical resistivity is the value measured prior to application of a protective film 4 after deposition of the reflective film 3 (in the state in which a protective film 4 has not been applied).

TABLE 1

| Film thickness (nm) | Ultimate vacuum (Pa) | Spattering Ar pressure (Pa) | Recording power (mW) | Electrical resistivity (μΩ · cm) |
|---|---|---|---|---|
| 35 | $2 \times 10^{-4}$ | 0.25 | 17.1 | 78.4 |
| 40 | $2 \times 10^{-4}$ | 0.25 | 21.3 | 68.0 |
| 45 | $2 \times 10^{-4}$ | 0.25 | 23.2 | 65.7 |
| 50 | $2 \times 10^{-4}$ | 0.25 | 25.6 | 61.0 |
| 55 | $2 \times 10^{-4}$ | 0.25 | 28.8 | 58.0 |
| 45 | $1 \times 10^{-4}$ | 0.25 | 23.5 | 65.0 |
| 45 | $4 \times 10^{-4}$ | 0.25 | 23.2 | 65.9 |
| 45 | $8 \times 10^{-4}$ | 0.25 | 23.0 | 66.1 |
| 45 | $2 \times 10^{-3}$ | 0.25 | 21.8 | 68.5 |
| 45 | $2 \times 10^{-4}$ | 0.15 | 23.5 | 65.5 |
| 45 | $2 \times 10^{-4}$ | 0.35 | 23.3 | 65.9 |
| 45 | $2 \times 10^{-4}$ | 0.45 | 22.4 | 67.2 |
| 45 | $2 \times 10^{-4}$ | 0.60 | 21.1 | 69.7 |

However, in general, data reproduction is said to be possible with a sufficiently low error rate if the CNR is approximately 40 dB or higher; but in this invention, it is sufficient that additional recording can be performed, and there is no need to perform high-density recording such as in conventional write-once and rewritable optical discs. Hence a CNR lower than that of the prior art, such as for example approximately 30 dB, is sufficient to enable actual use.

Because the amount of additionally recorded data is not huge, when recording densities are increased it is sufficient to add powerful error correction functions.

As is seen from the various measurement results in Table 1, the recording power and resistivity change in response to changes in the film thickness, the ultimate vacuum pressure, and the sputtering argon gas pressure during deposition of the reflective film 3.

In read-only optical discs such as CDs and DVDs, in order to mass-produce extremely large numbers of discs and to lower costs, ordinarily rigid control of conditions is not performed in conventional mass-production film deposition equipment. Consequently when there is a factor causing fluctuations in the above-described conditions, the recording characteristics of the reflective film 3 are affected.

Normally the thickness of a film deposited by sputtering is controlled through the sputtering power or time, and fluctuations in the film thickness can be absorbed by controlling these process conditions.

On the other hand, when there are fluctuations in target composition, in ultimate vacuum pressure, in sputtering argon pressure, and in other factors not related to film thickness, control of each of these remains a problem with respect to mass production.

Figure 7:
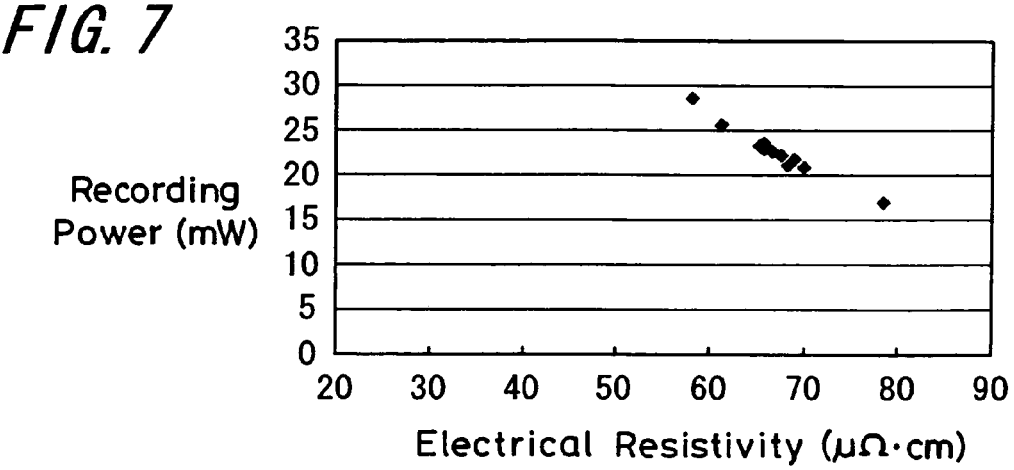
FIG. 7 is a plot of the measurement results of Table 1.

The results of Table 1 are plotted with the electrical resistivity along the horizontal axis and the recording power along the vertical axis in FIG. 7.

From FIG. 7, it is seen that the higher the electrical resistivity of the material, the lower the laser power sufficient to enable recording.

In FIG. 7, when the film thickness is 55 nm or 35 nm, the results are considerably distant from those for other film thicknesses, and so are not very useful; however in the case of the other results, the relation between recording power and electrical resistivity is seen to substantially describe a straight line when fluctuations occur in the film thickness (40 to 50 nm), ultimate vacuum pressure, or sputtering gas pressure.

Hence by monitoring the electrical resistivity of the reflective film 3 after deposition, and providing feedback to conditions such as the film thickness which are easily controlled such that the value of the electrical resistivity is constant, fluctuation factors other than film thickness can be absorbed by controlling the film thickness, and fluctuations in recording characteristics can be suppressed.

It is widely known that when the ultimate vacuum pressure is not sufficiently low, oxygen and other impurities may be included in the sputtered film, and consequently the electrical resistivity of the reflective film 3 rises, and the recording power necessary for recording is lowered.

On the other hand, it is widely known that changes in the pressure of the argon gas used for sputtering result in changes in the film density and structure, and, in the case of an alloy film, in changes in the film composition. In particular, when the argon gas pressure is high, the inclusion of oxygen or argon gas or similar as impurities causes increases in the electrical resistivity of the reflective film 3, and also lowers the recording power necessary to perform recording.

Next, various elements were added to Al alloy, and the amounts added were also changed, varying the material composition of the reflective film 3 to fabricate an optical recording medium; the recording power at which a CNR of 30 dB was obtained and the electrical resistivity were then measured for these optical recording medium. Measurement results appear in Table 2.

For all the material compositions, the thickness of the reflective film 3 was 45 nm.

TABLE 2

| Material composition (at %) | Recording power (mW) | Electrical resistivity (μΩ·cm) | Reflectivity (%) |
|---|---|---|---|
| Al | — | 8.7 | 84 |
| $Al_{96.6}Ti_{3.4}$ | — | 23 | 82 |
| $Al_{96.0}Ti_{4.0}$ | — | 29 | 81 |
| $Al_{94.9}Ti_{5.1}$ | 28.2 | 41 | 80 |
| $Al_{93.6}Ti_{6.4}$ | 26.2 | 46 | 76 |
| $Al_{87.5}Si_{12.5}$ | — | 27 | 77 |
| $Al_{86.5}Si_{13.5}$ | 31.5 | 37 | 73 |
| $Al_{81}Si_{19}$ | 24.6 | 77 | 71 |
| $Al_{97.1}Tb_{2.9}$ | — | 26 | 75 |
| $Al_{94.9}Tb_{5.1}$ | 30.5 | 37 | 73 |
| $Al_{96.7}Fe_{3.3}$ | — | 25 | 70 |
| $Al_{94.7}Fe_{5.3}$ | 29.7 | 44 | 70 |
| $Al_{93.1}Fe_{6.9}$ | 24.5 | 83 | 61 |
| $Al_{91}Fe_9$ | 19.3 | 110 | 55 |
| $Al_{91.5}Cr_{8.5}$ | 24.0 | 88 | 65 |
| $Al_{93.8}W_{6.2}$ | 22.5 | 82 | 62 |
| $Al_{86}Cu_{14}$ | 27.7 | 48 | 74 |
| $Al_{74.4}Cu_{25.6}$ | 23.5 | 79 | 60 |
| $Al_{90.6}Ti_{5.1}Cu_{4.3}$ | 25.5 | 51 | 72 |
| $Al_{82.0}Ti_{4.7}Cu_{13.3}$ | 24.5 | 69 | 70 |
| $Al_{94.0}Ti_{5.1}Fe_{0.9}$ | 23.8 | 63 | 72 |
| $Al_{93.6}Ti_{5.1}Fe_{1.3}$ | 21.5 | 77 | 71 |
| $Al_{86.0}Mg_{8.8}Ti_{4.6}Fe_{0.6}$ | 30.8 | 33 | 76 |
| $Al_{83.6}Mg_{9.6}Ti_{5.1}Fe_{1.7}$ | 25.5 | 58 | 73 |
| $Al_{84.6}Mg_{9.6}Ti_{5.1}Fe_{0.7}$ | 27.3 | 43 | 75 |

From Table 2, it is seen that without being much affected by the type of impurity, the electrical resistivity increases as the amount of added impurities increases.

Figure 8:
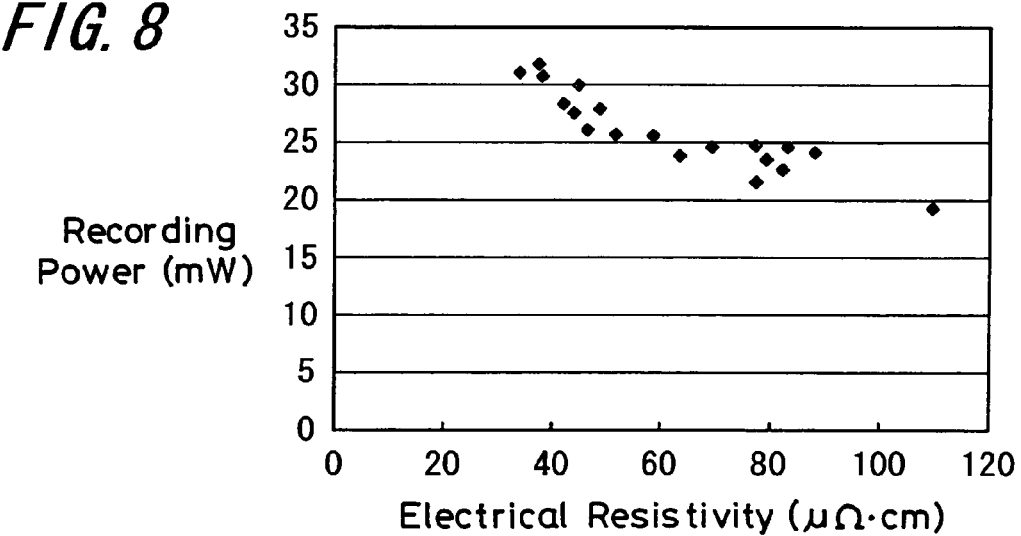
FIG. 8 is a plot of the measurement results of Table 2.

Based on the results of Table 2, FIG. 8 plots the electrical resistivity along the horizontal axis and the recording power along the vertical axis.

From FIG. 8, it is seen that when the electrical resistivity is 33 μΩ·cm or higher, recording is possible at a recording power of 35 mW or less (obtaining a CNR of 30 dB).

However, as shown in Table 2, as the electrical resistivity increases the reflectivity also declines, so that an excessive increase in the electrical resistivity poses a problem with respect to compatibility with existing optical disc reproducing devices (if the reflectivity is too low, signal detection is not possible in existing optical disc reproducing devices).

Consequently it is preferable that the reflectivity be 60% or higher, that is, that the electrical resistivity be 90 μΩ·cm or less.

On the other hand, when recording a disc ID number or similar information on an optical recording medium (optical disc) prior to shipment from the factory, it is also possible to perform recording before formation of the protective film 4.

Table 3 shows results obtained upon recording to discs on which a protective film 4 has not been formed, under the same conditions as in Table 2 (material composition, film thickness).

TABLE 3

| Material composition (at %) | Recording power (mW) | Electrical resistivity (μΩ·cm) |
|---|---|---|
| Al | — | 8.7 |
| $Al_{96.6}Ti_{3.4}$ | — | 23 |
| $Al_{96.0}Ti_{4.0}$ | 31.3 | 29 |
| $Al_{94.9}Ti_{5.1}$ | 24.8 | 41 |
| $Al_{93.6}Ti_{6.4}$ | 21.5 | 46 |
| $Al_{87.5}Si_{12.5}$ | — | 27 |
| $Al_{86.5}Si_{13.5}$ | 27.5 | 37 |
| $Al_{81}Si_{19}$ | 21.0 | 77 |
| $Al_{97.1}Tb_{2.9}$ | — | 26 |
| $Al_{94.9}Tb_{5.1}$ | 27.5 | 37 |
| $Al_{96.7}Fe_{3.3}$ | 31.0 | 25 |
| $Al_{94.7}Fe_{5.3}$ | 27.0 | 44 |
| $Al_{93.1}Fe_{6.9}$ | 21.3 | 83 |
| $Al_{91}Fe_9$ | 16.5 | 110 |
| $Al_{91.5}Cr_{8.5}$ | 20.1 | 88 |
| $Al_{93.8}W_{6.2}$ | 18.5 | 82 |
| $Al_{86}Cu_{14}$ | 23.3 | 48 |
| $Al_{74.4}Cu_{25.6}$ | 19.5 | 79 |
| $Al_{90.6}Ti_{5.1}Cu_{4.3}$ | 19.8 | 51 |
| $Al_{82.0}Ti_{4.7}Cu_{13.3}$ | 17.5 | 69 |
| $Al_{94.0}Ti_{5.1}Fe_{0.9}$ | 17.0 | 63 |
| $Al_{93.6}Ti_{5.1}Fe_{1.3}$ | 16.5 | 77 |
| $Al_{86.0}Mg_{8.8}Ti_{4.6}Fe_{0.6}$ | 25.3 | 33 |
| $Al_{83.6}Mg_{9.6}Ti_{5.1}Fe_{1.7}$ | 21.3 | 58 |
| $Al_{84.6}Mg_{9.6}Ti_{5.1}Fe_{0.7}$ | 22.7 | 43 |

From Table 3, it is clear that compared with the case in which a protective film 4 is applied, when the material composition of the reflective film 3 is the same, recording is performed at a lower recording power.

Hence in this case, it is seen that adequate recording can be performed even when the electrical resistivity of the reflective film 3 is 25 μΩ·cm.

Although not stated in Table 3, the CNR when recording at an adequate recording power is higher by several decibels compared with the case in which recording is performed after formation of the protective film 4. This is attributed to the superposed effect of deformation due to heat (regardless of the material composition of the reflective film 3) in the shape of the substrate 1 at the interface with the reflective film 3, in addition to changes in the reflective film 3 due to heat.

Figure 9:
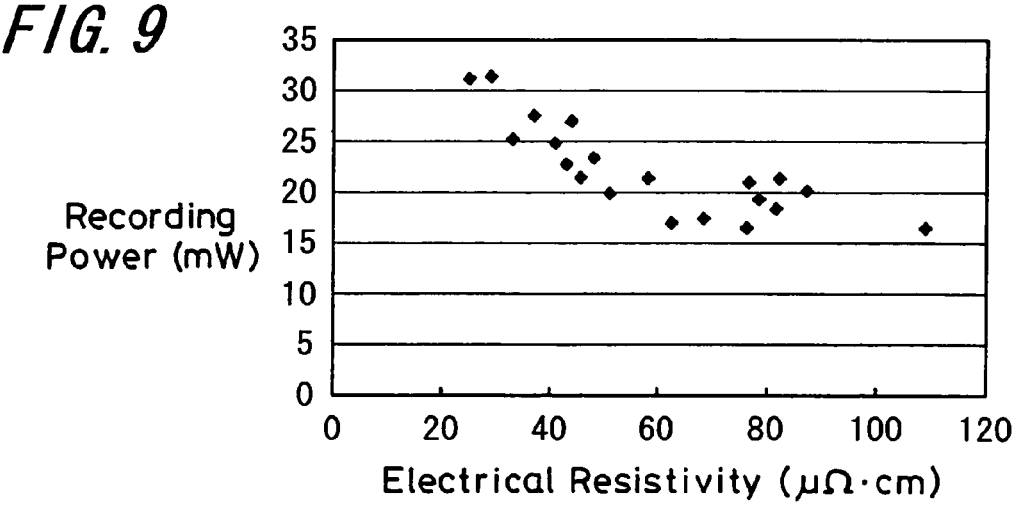
FIG. 9 is a plot of the measurement results of Table 3.

The results of Table 3 are plotted in FIG. 9, with the electrical resistivity along the horizontal axis and the recording power along the vertical axis.

Comparing FIG. 9 and FIG. 8, it is seen that overall there is a shift to the lower recording power side.

The mechanism of recording in a film comprising Al with impurities added is not understood in detail, due to the different phenomena depending on the disk state during recording; however the following may be inferred with regard to differences in recording power when recording on the reflective film is performed in a state in which a protective film is present, as in Table 2, and when recording on the reflective film is performed in a state in which no protective film exists, as in Table 3.

When recording in a state with a protective film, that is, when recording is performed after forming a protective film, the main factors are thought to be changes in the microstructure of the Al alloy film forming the reflective film, or reflectivity changes caused by chemical reaction occurred at the interface between the Al alloy film and the substrate or occurred at the interface between the Al alloy film and the protective film.

Here, after performing recording on the reflective film, comprising an Al alloy film in a state of having a protective film, the protective film was stripped away, the reflective film comprising the Al alloy film was dissolved in an alkaline solution, and then an Al alloy film was again deposited, the deposited Al alloy film was irradiated with laser light for reproduction, and the signal thus obtained was studied. In this case, the signal level was greatly deteriorated, and had returned to the state prior to recording.

Consequently it is thought that no great changes in the shape of the substrate occur due to recording, and that changes in the reflectivity caused by recording are due mainly to the above-described factors.

On the other hand, upon recording on a reflective film comprising Al alloy film without a protective film formed, and then performing a similar experiment, there was not considerable decline in the signal level.

That is, even when the Al alloy film in which recording had been performed was stripped away and a new Al alloy film was deposited, the effect of recording in the stripped-away original Al alloy film was reflected in the output.

Hence it is inferred that when recording is performed without a protective film, in addition to changes in the crystallinity of the Al alloy film and chemical changes at the interface, there are also considerably large changes in reflectivity arising from changes in the substrate shape.

As described above, since the changes in the substrate shape also occurred, change in the reflectivity of the reflective film caused by recording becomes obvious. Hence it is inferred that recording on the reflective film can be performed at the recording power lower than that in a case with the protective film.

For any of these recording mechanisms, as a first approximation, the temperature to which the Al alloy film is heated, specifically, the temperature reached during recording, is the cause of the signal volume to change. The temperature reached during recording is determined by the thermal conductivity of the Al alloy film, and from equation (1), the thermal conductivity is inversely proportional to the electrical resistivity. Hence the relation between the recording power and the signal does not depend heavily on the impurity elements, but is essentially determined by the temperature reached during recording, that is, by the electrical resistivity.

Next, the recording power at which a CNR of 30 dB is obtained when using a Cu alloy with various material compositions as the reflective film 3, both for recording with a protective film 4 and for recording without a protective film, was measured, together with the electrical resistivity of the Cu alloys with various material compositions. The results appear in Table 4.

TABLE 4

| Material composition (at %) | Recording power (mW) with protective film | Recording power (mW) without protective film | Electrical resistivity ($\mu\Omega \cdot cm$) |
|---|---|---|---|
| $Cu_{96.1}Al_{3.9}$ | — | — | 23 |
| $Cu_{94.6}Al_{5.4}$ | 27.0 | — | 33 |
| $Cu_{91.5}Al_{8.5}$ | 27.1 | 24.5 | 35 |
| $Cu_{89.5}Al_{5.1}Ti_{5.4}$ | 23.5 | 19.0 | 51 |
| $Cu_{90.5}Al_{4.6}Ti_{4.9}$ | 24.1 | 19.5 | 46 |

From Table 4, it is seen that in the case of a reflective film 3 of Cu alloy also, similarly to Al alloys, the electrical resistivity is increased compared with simple Cu, and recording on the reflective film 3 can be performed at low recording powers.

And, when Cu alloy is used as the reflective film 3, similarly to Al alloys, it is inferred that recording is possible through optical changes in the film and changes in the shape of the polycarbonate substrate surface resulting from increases in temperature during recording.

In Table 1 through Table 4, the measured values for the recording power are the recording power values at which the CNR is 30 dB, and so, because a CNR of 30 dB is not obtained even when the electrical resistivity of the reflective film 3 is 20 $\mu\Omega \cdot cm$ or more, measured values of the recording power are not given.

In actuality, depending on the construction of the optical reproducing device (or optical recording and reproducing device), even when the CNR is less than 30 dB, there may be cases in which adequate signal reproduction is possible.

Even when using such a device, it is preferable that the electrical resistivity of the reflective film 3 be 20 $\mu\Omega \cdot cm$ or more in order to perform adequate reproduction of signals of additional recording.

When performing additional recording on the reflective film 3 after forming a protective film 4, it is preferable that the electrical resistivity of the reflective film 3 be 30 $\mu\Omega \cdot cm$ or more.

Figure 10:
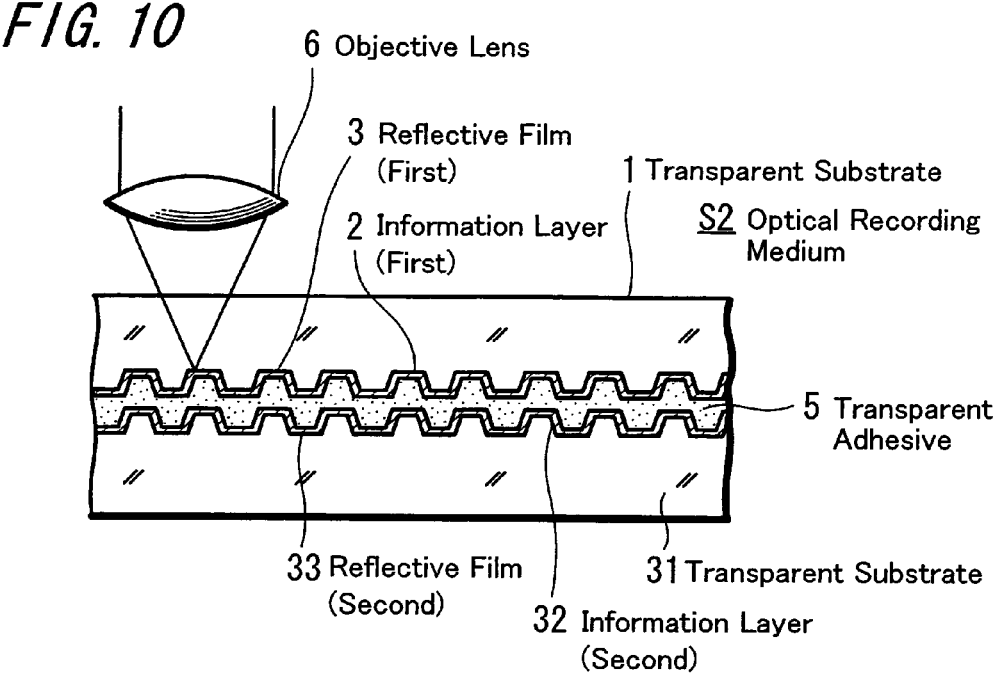
FIG. 10 is a schematic constitutional view (cross-sectional view) of the optical recording medium of another embodiment of the present invention.

In the above-described embodiment, the case where the present invention is applied to an optical recording medium (an optical disc) with the construction shown in FIG. 1 was explained; however this invention can be similarly applied to an optical recording medium with a different construction, such as for example an optical disc with a structure composed of two substrates being laminated together, as shown in FIG. 10.

The optical recording medium S2 shown in FIG. 10 is constructed by forming, superposed on a first information layer 2, a second transparent substrate 31 having a second information layer 32 in which is similarly formed a second reflective film 33, bonded together by transparent adhesive 5, to form an optical recording medium S2 having two information layers.

In this case, a construction is possible in which additional recording is performed on the second reflective film 33 from the side of the second transparent substrate 31, and additional recording in the second information layer 32 and the readout of originally recorded data can be performed.

On the other hand, when a construction is adopted in which additional recording on the second reflective film 33 is performed from the side of the transparent substrate 1, and additional recording in the second information layer 32 and readout of originally recorded data are performed, the (first) reflective film 3 needs to be a semi-transparent film. Hence an Al alloy film or Cu alloy film about 40 nm to 45 nm in thickness as described above is used as the second reflective film 32, and a thin Al alloy film or Cu alloy film of thickness, for example, 5 nm to 20 nm approximately, so as to be a semi-transparent film, is used as the first reflective film 3. When thus employing a construction in which a thin alloy film is used as the first reflective film 3, the first reflective film 3 is made semi-transparent, and in addition additional recording to the first reflective film 3 can be performed.

Also, a construction may be adopted in which without additional recording to the first reflective film 3, a reflective film of Si or Ag alloy conventionally used as a semi-transparent film in DVDs and similar may be used, the Al alloy film or Cu alloy film of this invention may be used as the second reflective film 33, and additional recording is performed only on the second reflective film 33.

Further, a construction is possible in which as the material for the first reflective film 3, an Si or Ag alloy, composition and film thickness of which are selected enabling the film to be semi-transparent so that additional recording can be performed, is employed, and additional recording is performed on both the first reflective film 3 and the second reflective film 33.

In the optical recording medium S2 of FIG. 10, when recording onto the reflective films 3, 33 prior to forming a protective film (not shown in the figure) on the surface, after depositing the reflective films 3, 33 on the respectively transparent substrates 1, 31 and recording onto the reflective films 3, 33, the two transparent substrates 1, 31 may be laminated using an ultraviolet-curing resin or similar, curing by ultraviolet irradiation for use as the transparent adhesive 5.

According to the optical recording medium of this invention, by enabling additional recording it is possible for example to enter encoded data at the time of manufacturing, and by reproducing this code using a reproducing device having an algorithm capable of decoding the code, it is possible for example to prevent reproduction of an optical recording medium which has been copied illegally; and various other modes of use are also possible.

Further, a variety of other modes of utilization can be adopted, such as for example enabling rental businesses to prohibit use by other than specified persons through the additional recording of a special password for particular persons to whom rental has been permitted, or for example enabling ordinary users to record data regarding medium management, the ending point in game software, marks showing the positions which have been reproduced, user information or similar, as well as to record the number of times data has been reproduced, and further adding readout functions to recording and reproducing devices.

An optical recording device of this invention comprises means for optical recording on the above-described optical recording medium of this invention. This optical recording means has a construction in which means for irradiating the optical recording medium with laser light, modulated according to additional recording information is included, and through laser light irradiation, by thermal recording in which the properties of the reflective film are altered and the reflectivity is changed, additional recording can be performed.

An optical reproducing device of this invention comprises means for optical reproduction from the above-described optical recording medium of this invention, on which additional recording has been performed. This optical reproducing means has reproduction light irradiation means for irradiating the optical recording medium with reproduction light, and detection means for detecting light returning from a reflective light thereof; minute changes in the detected output from the detection means are used as signals reproducing the additionally recorded information.

An optical recording and reproducing device of this invention comprises means for optical recording onto the above-described optical recording medium of this invention and means for optical reproduction from the above-described optical recording medium of this invention. The optical recording means has means for irradiating the optical recording medium with laser light modulated according to the additionally recorded information; through laser light irradiation, thermal recording is performed in which the properties of the above reflective film are altered and the reflectivity is changed for additional recording. The optical reproducing means has means for irradiating reproduction light onto the optical recording medium, and detection means for detecting light returning from the reflective film; minute changes in the detected output from the detection means are used as signals reproducing the additionally recorded information.

Figure 11:
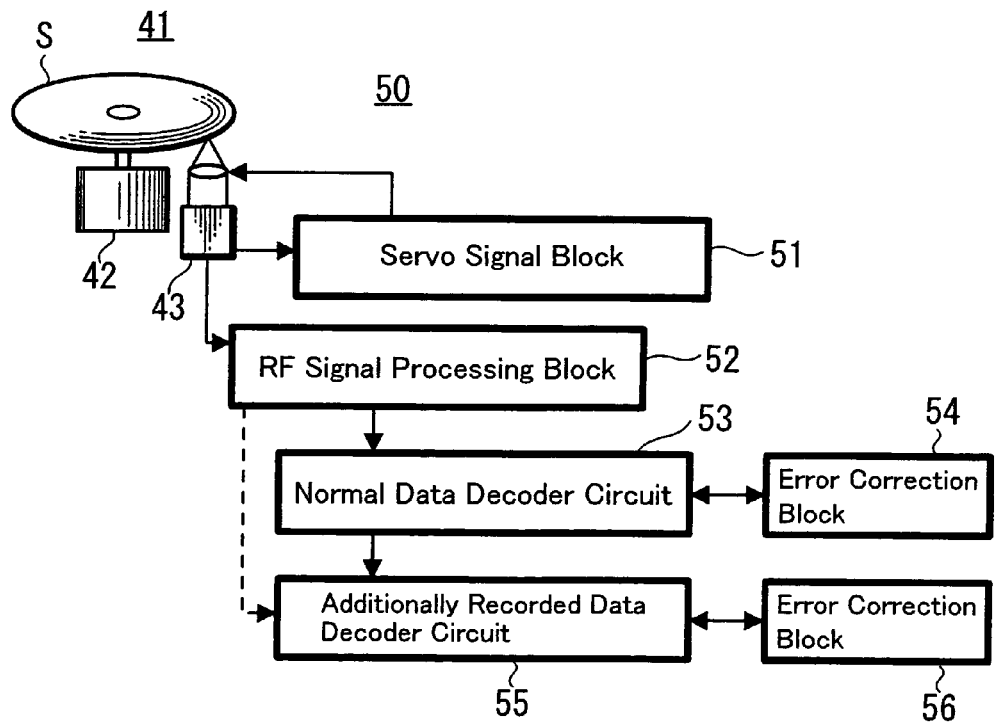
FIG. 11 is a drawing showing an embodiment of the circuit of a reproduction signal system used in a device of the present invention.

When the optical recording medium and manufacturing method thereof of this invention are adopted to perform required additional recording, upon reading out the additionally recorded signals, a reproduction signal system circuit such as shown in FIG. 11 is provided in the optical recording and reproducing device and optical reproducing device. By this means, additionally recorded signals can be reproduced.

The circuit of the reproduction signal system shown in FIG. 11 performs (recording and) reproduction from the optical recording medium S explained in FIG. 1, for example and in this case has a driving portion 41 for driving the optical recording medium S to rotate. This driving portion 41 employs a spindle motor 42 to drive and rotate the optical recording medium. In this spindle motor 42, a servo circuit (not shown) controls the rotation speed of the optical recording medium S.

In opposition to this optical recording medium S, an optical pickup 43 is provided as optical reproducing means to reproduce data additionally recorded to the optical recording medium S. In the optical recording and reproducing device, this optical pickup 43 can be constructed to also serve as optical recording means to perform the above-described additional recording.

This optical pickup 43 is constructed so as to move in parallel to the radial direction of the optical recording medium S by means of a sled mechanism, not shown in the figure.

Further, this optical pickup 43 has light irradiation means comprising a semiconductor laser, as for example in the configuration of an optical pickup in conventional optical reproducing devices and optical recording and reproducing devices; laser light from the semiconductor laser is focused and irradiates the optical recording medium S by means of an objective lens.

This light irradiation means comprises modulation means for modulating the amount of the laser light irradiating the optical recording medium S according to the additionally recorded information, such as for example a light intensity modulating element positioned in the optical path of the laser light, or modulation means to control the power of the semiconductor laser, configured so as to enable irradiation of the optical recording medium S with recording laser light. At the same time, upon reproduction, the light irradiation means is configured to irradiate laser light as the reproduction light.

Further, the optical pickup 43 has a detection portion which detects the above-described laser light returning from the optical recording medium S and extracts the return light as electrical output.

As described above, recording of additional recording information onto the additional recording portions 12A, and readout of the originally recorded information from the above-described recording pits 12P and of additionally recorded information from the additional recording portions 12A are performed.

Similarly to a conventional optical pickup, tracking error signals and focusing error signals are obtained, and tracking servo and focusing servo control are performed based on these error signals.

A circuit portion 50 is provided to control the optical recording and optical reproduction operation of the optical pickup 43. This circuit portion 50 comprises a servo signal block 51, RF signal block 52, normal data decoder circuit 53, error correction block 54, additionally recorded data decoder circuit 55, and error correction block 56.

In the servo signal block 51, signal processing and control are performed for the above-described tracking servo and focusing servo, as well as for other servo circuits.

The normal data decoder circuit 53, error correction block 54, additionally recorded data decoder circuit 55, and error correction block 56 are provided within the same integrated circuit for signal reproduction.

In this configuration, signals are reproduced as follows.

The optical recording medium S is for example constructed to have, in a predetermined portion, an additional recording portion 12A in which the manufacturer records various codes and marks, such as for example a mark to detect illicit use.

When the optical recording medium S is positioned in the driving portion 41, laser light from the optical pickup 43 irradiates a position for irradiating the additional recording positions of the optical recording medium S, that is, a predetermined position in which a mark has been recorded, under the control of a CPU or the like, not shown in the figure. Laser output is set as appropriate to detecting this mark.

In this way, reproduction output based on the mark of the additional recording portion 12A is extracted from the optical pickup 43. Then, by for example the input of detected mark output to the CPU based on this reproduction output, the reproduction operation is for example halted under CPU control.

When operation is not thus halted, the laser light from the optical pickup 43 irradiates a predetermined original recording portion 12 of the optical recording medium S under instruction from the CPU, and reproduction is performed. That is, a readout signal (RF signal) from the recording portion 12 by the optical pickup 43 is converted to a binary signal at a predetermined slice level within the RF signal processing block 52, to obtain a digitized binary signal. Further, this binary signal is then decoded by the normal data decoding circuit 53, to generate reproduced data. In the error correction block 54, the reproduced data is subjected to error correction processing using error correction codes which had been additionally recorded upon encoding at the time of recording, and in the digital/analog conversion circuit the signal is converted to an analog signal, so that the original recorded information recorded in the recording portion 12 is reproduced.

When additional recording is performed only in regions separate from the recording portion 12 in which the original recording information is recorded by means of pits and lands or similar, similarly to the above-described reproduction of the originally recorded information, an additional recording portion readout signal (RF signal) from the optical pickup 43 may be reproduced for example by converted into a binary signal in the RF signal processing block 52 using a predetermined slice level, and the resulting binary signal decoded by the additionally recorded data decoder circuit 55, and then subjected to error-correction processing in the error correction block 56.

When additional recording is performed in recording portions 12 in which the original recording information is recorded, when the frequency band of additionally recorded data signals is sufficiently low compared with the frequency band of the original recorded data signals, a filter can be used to separate the two types of data signals.

On the other hand, when the separation can not be attained by a filter, the original information recorded in the recording portion 12 is reproduced as described above, and based on this originally recorded information an RF signal waveform is created; and this waveform of the original recorded information is compared with the waveform of readout signals (RF signals) of the recording portion 12 from the optical pickup 43 and performed operation (subtraction processing).

The waveforms corresponding to the difference of the RF signals obtained in this way are used to decode binary signals by the additionally recorded data decoding circuit 55, and in the error correction block 56 error correction processing is performed to reproduce the additionally recorded information.

Additional recording to the optical recording medium S is performed as follows.

The laser light irradiation position is set to a predetermined position to perform additional recording, and control signals based on the recording information are used to modulate the laser light of the optical pickup 43, to perform additional recording by irradiating the reflective film 3 of the additional recording portion 12A with laser light.

In the above, one embodiment of an optical recording and reproducing device of this invention, having functions of reproducing from and recording to an optical recording medium S, was explained; however, an optical recording device of this invention, or an optical reproducing device of this invention, may be respectively configured as a device comprising one of the two above-described functions, of optical recording or of optical reproduction.

Further, the optical recording medium, optical recording and reproducing device, optical recording device, and optical reproducing device of this invention are not limited to those optical recording media in the above-described embodiments (FIG. 1, FIG. 10), and this invention can be similarly applied to other optical recording media (optical discs and similar) having so-called ROM portions.

The present invention is not limited to the above-described embodiments, and various configurations may be adopted, without departing from the essence of this invention.

With the above-described optical recording medium of this invention, since additional recording in a read-only optical recording medium is made possible, there can be performed easily, for example, recording by a user of a position at which reproduction is completed and marks at the end of a game in game software, recording of individual information (such as for example the number of times reproduced, user information, the position at which reproduction was interrupted, and other data, as well as partial modification of data stored in ROM mode) by a user using a recording device. For example, by using a network to transfer data, the various functions described above can be executed online.

Further, recording of passwords for particular borrowers, the number of times reproduced, or other arbitrary information by a rental business is possible.

On the side of the manufacturer, by recording a management code or similar, the manufacturer can be identified, limitations can be placed on reproducible content, and discrimination and control of illegal copies can be executed.

For example, by recording encoded data at the time of manufacturing as described above, and by reproducing the optical recording medium using a reproducing device having an algorithm enabling decoding of the code, it is possible to disable reproduction of illegally copied optical recording medium, and numerous other modes of use are possible.

Further, in the optical recording medium of this invention, as the recording layer to perform the above-described additional recording, by selecting a composition for reflective film formed on the original information layer rather than providing a recording layer with a special configuration, the reflective film can itself be constructed as an additional recording region for additional recording, so that manufacturing the optical recording medium can be performed in volume without resulting in any increase in the number of manufacturing processes, and with avoiding the use of harmful substances, with manufacturing performed inexpensively and with productivity and cost equivalent to those of a conventional read-only optical recording medium.

The method of recording onto the optical recording medium of this invention enables optical recording using a semiconductor laser, so that the recording device, that is, the optical recording device, can be constructed according to the object of the additional recording, but in essence no special configuration is required.

Further, the method of reproduction from the optical recording medium of this invention enables optical reproduction using a semiconductor laser, so that a configuration can be employed according to the object of the additional recording, but in essence, as in the case of conventional optical recording and reproducing devices, readout using a semiconductor laser is possible, so that a simple configuration can be employed.

In the optical recording medium of this invention, by stipulating the electrical resistivity of the reflective film on which recording is performed, fluctuations in the power necessary for recording, which arise from fluctuations in the conditions of manufacturing processes, are suppressed, and stable recording can be performed.

The invention claimed is:

1. An optical recording medium, having an information layer in which an information recording portion is formed by physical shape changes in, at least, either the thickness direction or the track width direction, and which comprises a reflective film, wherein
    said reflective film is constructed to enable additional recording by thermal recording, and is formed of Al alloy or Cu alloy having an electrical resistivity of 20 $\mu\Omega\cdot$cm or more and 90 $\mu\Omega\cdot$cm or less.

2. The optical recording medium according to claim 1, wherein at least one element selected from among, at least, Ti, Si, Cu, Al, Fe, W, Cr, O, Ar, Mg, and Tb is added to said Al alloy or said Cu alloy.

3. The optical recording medium according to claim 1, wherein recording regions for said additional recording are provided within or outside of recording regions having information recording portions in which said physical shape changes have been made.

4. The optical recording medium according to claim 1, wherein a protective film is formed on said reflective film.

5. The optical recording medium according to claim 4, wherein the electrical resistivity of said reflective film is 30 $\mu\Omega\cdot$cm or more, and 90 $\mu\Omega\cdot$cm or less.

6. A method for manufacturing an optical recording medium, comprising the steps of:
    forming a reflective film of Al alloy or Cu alloy the electrical resistivity of which is 20 $\mu\Omega\cdot$cm or more and 90 $\mu\Omega\cdot$cm or less, on a substrate on which an information recording portion is formed by physical shape changes in, at least, the thickness direction or the track width direction, and
    performing additional recording of information on said reflective film by thermal recording.

7. The method for manufacturing an optical recording medium according to claim 6, wherein after performing said additional recording, a protective film is formed on said reflective film.

8. A method for manufacturing an optical recording medium, comprising the steps of:
    forming a reflective film of Al alloy or Cu alloy the electrical resistivity of which is 20 $\mu\Omega\cdot$cm or more and 90 $\mu\Omega\cdot$cm or less, on a substrate on which an information recording portion is formed by physical shape changes in, at least, the thickness direction or the track width direction;
    forming a protective film on said reflective film; and
    performing additional recording of information on said reflective film by thermal recording.

9. An optical recording method, wherein in an optical recording medium having an information layer in which an information recording portion is formed by physical shape changes in, at least, either the thickness direction or the track width direction, and which comprises a reflective film, and said reflective film is of Al alloy or Cu alloy having an electrical resistivity of 20 $\mu\Omega\cdot$cm or more and 90 $\mu\Omega\cdot$cm or less,
    information is additionally recorded by thermal recording in which the properties of said reflective film are altered to change the reflectivity thereof.

10. The optical recording method according to claim 9, wherein a protective film is formed on said reflective film of said optical recording medium, and the electrical resistivity of said reflective film is 30 $\mu\Omega\cdot$cm or more and 90 $\mu\Omega\cdot$cm or less.

11. An optical reproducing method, wherein in an optical recording medium having an information layer in which an information recording portion is formed by physical shape changes in, at least, either the thickness direction or the track width direction, and which comprises a reflective film, said reflective film is of Al alloy or Cu alloy having an electrical resistivity of 20 $\mu\Omega\cdot$cm or more and 90 $\mu\Omega\cdot$cm or less, and information is additionally recorded on said reflective film by thermal recording in which the reflectivity thereof is changed,
    said additionally recorded information is reproduced by irradiating laser light to obtain minute changes in the returning light due to reflectivity changes.

12. The optical reproducing method according to claim 11, wherein a protective film is formed on said reflective film in said optical recording medium.

13. The optical reproducing method according to claim 12, wherein the electrical resistivity of said reflective film of said optical recording medium is 30 $\mu\Omega\cdot$cm or more and 90 $\mu\Omega\cdot$cm or less.

14. An optical recording device, comprising
    optical recording means for recording on an optical recording medium having an information layer in which an information recording portion is formed by physical shape changes in, at least, either the thickness direction or the track width direction, and which comprises a reflective film of Al alloy or Cu alloy having an electrical resistivity which is 20 $\mu\Omega\cdot$cm or more and 90 $\mu\Omega\cdot$cm or less; wherein
    said optical recording means has means for irradiating said optical recording medium with laser light modulated according to the information for additional recording; and
    additional recording is performed by thermal recording, through irradiation with said laser light to alter the properties of said reflective film and change the reflectivity thereof.

15. An optical reproducing device, comprising optical reproducing means for reproducing data from an optical recording medium having an information layer in which an information recording portion is formed by physical shape changes in, at least, either the thickness direction or the track width direction, and which comprises a reflective film of Al alloy or Cu alloy having an electrical resistivity of 20 μΩ·cm or more and 90 μΩ·cm or less; wherein said optical reproducing means has reproduction light irradiation means for irradiating said optical recording medium with reproduction light and detection means for detecting light returning from said reflective film, and minute changes in the detected output from said detection means are obtained as the reproducing signal of said additional recording.

16. An optical recording and reproducing device, comprising optical recording and reproducing means for recording and reproducing data on an optical recording medium having an information layer in which an information recording portion is formed by physical shape changes in, at least, either the thickness direction or the track width direction, and which comprises a reflective film of Al alloy or Cu alloy having an electrical resistivity of 20 μΩ·cm or more and 90 μΩ·cm or less; wherein said optical recording and reproducing means has means for irradiating said optical recording medium with laser light modulated according to information for additional recording;

additional recording is performed by thermal recording, through irradiation with said laser light to alter the properties of said reflective film and change the reflectivity thereof; and said optical recording and reproducing means has reproduction light irradiation means for irradiating said optical recording medium with reproduction light and detection means for detecting light returning from said reflective film, and minute changes in the detected output from said detection means are obtained as the reproducing signal of said additional recording.

* * * * *

UNITED STATES PATENT AND TRADEMARK OFFICE
CERTIFICATE OF CORRECTION

PATENT NO. : 7,177,264 B2 Page 1 of 1
APPLICATION NO. : 10/481518
DATED : February 13, 2007
INVENTOR(S) : Katsuhisa Aratani, Shinji Minegishi and Makoto Tsukahara It is certified that error appears in the above-identified patent and that said Letters Patent is hereby corrected as shown below:

On The Title Page: Item (75) Inventors should read
--Inventors: Katsuhisa Aratani, Chiba (JP);
     Shinji Minegishi, Shizuoka (JP);
     Makoto Tsukahara, Shizuoka, (JP)--.

Signed and Sealed this

First Day of May, 2007

JON W. DUDAS
*Director of the United States Patent and Trademark Office*